(12) United States Patent
Perrin

(10) Patent No.: US 7,222,686 B2
(45) Date of Patent: May 29, 2007

(54) DRIVE TRAIN FOR SERIES/PARALLEL HYBRID VEHICLE

(75) Inventor: Didier Perrin, Montréal (CA)

(73) Assignee: TM4, Inc., Quebec (CA)

( * ) Notice: Subject to any disclaimer, the term of this patent is extended or adjusted under 35 U.S.C. 154(b) by 227 days.

(21) Appl. No.: 10/823,292

(22) Filed: Apr. 12, 2004

(65) Prior Publication Data
US 2005/0224264 A1    Oct. 13, 2005

(51) Int. Cl.
*B60K 1/00* (2006.01)
(52) U.S. Cl. ............ 180/65.2; 180/65.6; 903/922
(58) Field of Classification Search .......... 180/65.2, 180/65.3, 65.6; 903/921, 922, 924
See application file for complete search history.

(56) References Cited
U.S. PATENT DOCUMENTS

| | | | | |
|---|---|---|---|---|
| 5,643,119 A * | 7/1997 | Yamaguchi et al. | ......... | 475/5 |
| 5,722,502 A * | 3/1998 | Kubo | ......... | 180/65.4 |
| 6,083,138 A * | 7/2000 | Aoyama et al. | ......... | 477/5 |
| 6,116,363 A * | 9/2000 | Frank | ......... | 180/65.2 |
| 6,447,417 B2 | 9/2002 | Kanehisa | | |
| 6,476,571 B1 * | 11/2002 | Sasaki | ......... | 318/139 |
| 6,638,193 B2 * | 10/2003 | Hamai | ......... | 475/5 |
| 6,687,581 B2 * | 2/2004 | Deguchi et al. | ......... | 701/22 |
| 6,692,394 B2 * | 2/2004 | Takenaka | ......... | 475/5 |
| 6,886,648 B1 * | 5/2005 | Hata et al. | ......... | 180/65.2 |
| 6,961,654 B2 * | 11/2005 | Boggs et al. | ......... | 701/112 |
| 2001/0004027 A1 * | 6/2001 | Masaki | | |
| 2002/0065165 A1 * | 5/2002 | Lasson et al. | | |

FOREIGN PATENT DOCUMENTS

| | | |
|---|---|---|
| EP | 0 136 055 | 9/1988 |
| EP | 0 648 635 B1 | 7/1998 |
| EP | 1 002 689 A3 | 5/2000 |
| EP | 0 744 314 B1 | 9/2000 |
| EP | 1 145 896 A1 | 10/2001 |
| GB | 2 374 844 A | 10/2002 |

OTHER PUBLICATIONS

International Search Report for International Appl. No. PCT/CA2005/000545, Jun. 2, 2005 (4 pgs.).

\* cited by examiner

*Primary Examiner*—Christopher Bottorff
(74) *Attorney, Agent, or Firm*—Fay Kaplun & Marcin, LLP

(57) ABSTRACT

A drive train for a hybrid vehicle is described herein. The drive train includes an electric motor having a rotor linked to a ground contacting wheel of the vehicle, a combustion engine that may be selectively connected to the ground contacting wheel and an electric generator that may be directly or indirectly connected to the combustion engine. The drive train may be used in a series mode while the generator is operated at a nominal rotation speed via a speed increasing gear mechanism while the internal combustion engine operates at low speed and in a parallel mode while the generator is operated at a rotation speed of the combustion engine.

14 Claims, 3 Drawing Sheets

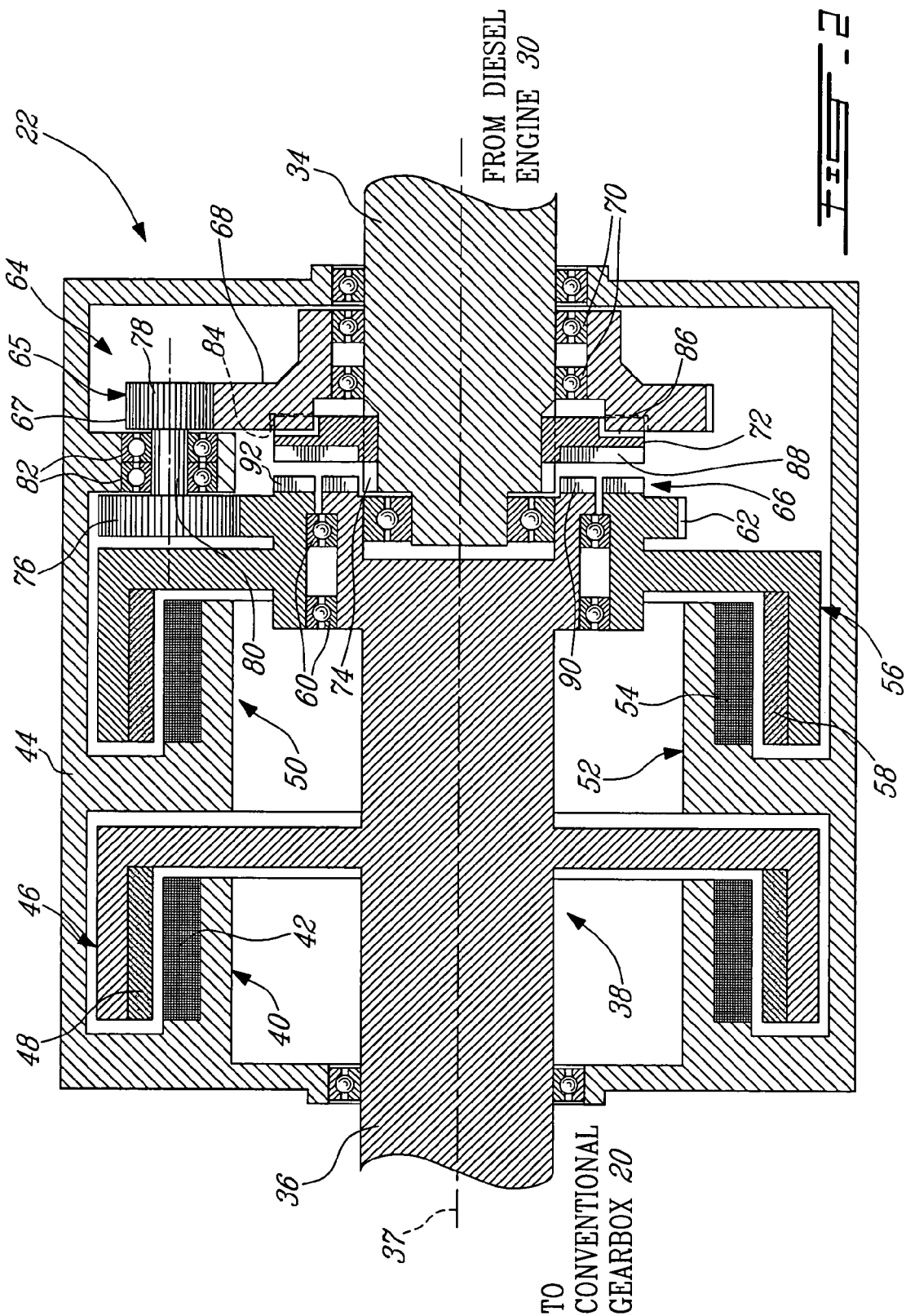

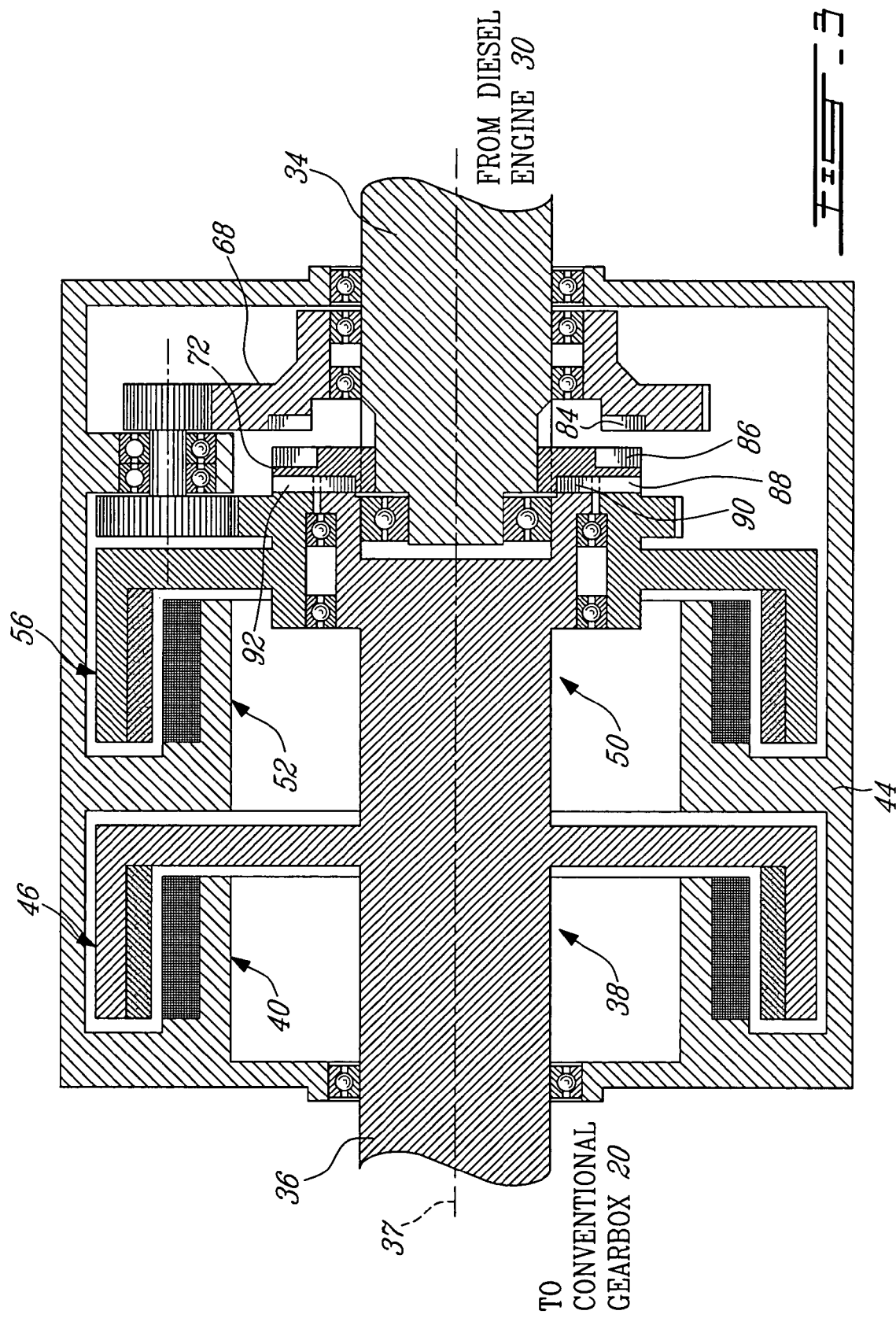

DRIVE TRAIN FOR SERIES/PARALLEL HYBRID VEHICLE

FIELD OF THE INVENTION

The present invention relates to hybrid vehicles. More specifically, the present invention is concerned with a drive train for a series/parallel hybrid vehicle.

BACKGROUND OF THE INVENTION

Hybrid vehicles are well known in the art. They are usually provided with an electric motor and an internal combustion engine (ICE) that may transmit power to at least one wheel of the vehicle and a generator used to supply electricity to the electric motor and/or to recharge batteries of the vehicle.

On the one hand, a hybrid vehicle is said to be a series hybrid vehicle when the electric motor is used to drive the wheels and the ICE is exclusively used to drive the generator to recharge the vehicle's batteries and/or supply electric power to the electric motor.

On the other hand, a hybrid vehicle is said to be a parallel hybrid vehicle when both the electric motor and the ICE are used simultaneously or individually to drive the wheels of the vehicle. In parallel hybrid vehicles, the ICE may also be used to recharge the batteries through a generator.

Series/parallel hybrid vehicles (SPHV) are also known in the art. Conventionally, these vehicles may be switched between a series mode and a parallel mode, as described hereinabove.

OBJECTS OF THE INVENTION

An object of the present invention is therefore to provide an improved series/parallel hybrid vehicle drive train.

SUMMARY OF THE INVENTION

More specifically, in accordance with an aspect of the present invention, there is provided a drive train for a hybrid vehicle including a driving wheel; said drive train comprising:

an internal combustion engine having a driving shaft;

an electric motor having a driving shaft connected to the driving wheel of the vehicle;

an electric generator having a rotor;

a rotational speed increasing gear arrangement having a high speed portion connected to said rotor of said generator and a low speed portion;

a switching mechanism connected to said driving shaft of said internal combustion engine; said switching mechanism being movable between a first position where it interconnects said driving shaft of said engine to said low speed portion of said gear arrangement and a second position where it interconnects said driving shaft of said engine to both said rotor of said generator and to said driving shaft of said electric motor;

wherein, a) when said switching mechanism is in said first position, the hybrid vehicle is in a series mode while said generator is operated at nominal rotation speed while said engine operates at low speed and b) when said switching mechanism is in said second position, the hybrid vehicle is in a parallel mode while said generator is operated at a rotation speed of said engine.

According to another aspect of the present invention, there is provided a drive train for a hybrid vehicle including a driving wheel and an internal combustion engine having a driving shaft; said drive train comprising:

an electric motor having a driving shaft connected to the driving wheel of the vehicle;

an electric generator having a rotor;

a rotational speed increasing gear arrangement having a high speed portion connected to said rotor of said generator and a low speed portion;

a switching mechanism connected to the driving shaft of the internal combustion engine; said switching mechanism being axially movable between a first position where it interconnects the driving shaft of the engine to said low speed portion of said gear arrangement and a second position where it interconnects the driving shaft of the engine to both said rotor of said generator and to said driving shaft of said electric motor;

wherein, a) when said switching mechanism is in said first position, the hybrid vehicle is in a series mode while said generator is operated at nominal rotation speed while the engine operates at low speed and b) when said switching mechanism is in said second position, the hybrid vehicle is in a parallel mode while said generator is operated at the rotation speed of the engine.

According to another aspect of the present invention, there is provided a method for controlling the drive train of a hybrid vehicle including an electric motor, an electric generator, an internal combustion engine and a driven wheel comprising the acts of:

providing a rotational speed increasing gear arrangement having a high speed portion connected to a rotor of the electric generator and a low speed portion;

providing a switching mechanism connected to a driving shaft of the internal combustion engine; the switching mechanism being axially movable between a first position where it interconnects the driving shaft of the engine to the low speed portion of the gear arrangement and a second position where it interconnects the driving shaft of the engine to both a rotor of the generator and to a driving shaft of the electric motor;

when a low speed serial hybrid mode is desired, placing the switching mechanism in the first position and operating the internal combustion engine at a predetermined low speed;

when a high speed parallel hybrid mode is desired, placing the switching mechanism in the second position and operating the internal combustion engine as determined by an input control.

It is to be noted that the expression "parallel hybrid mode" is to be construed herein and in the appended claims as being either a) a conventional parallel hybrid mode where both an electric motor and an internal combustion engine are used to drive at least one wheel of a vehicle and b) a mode where an internal combustion engine is used to drive a wheel of a vehicle and a rotor of a generator.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2 is a schematic sectional view of a portion of the mechanical connection between the internal combustion engine, the electric motor and the electric generator of the drive train of FIG. 1, the drive train being shown in a series configuration; and FIG. 3 is a schematic sectional view similar to FIG. 2, the drive train being in a parallel configuration.

DETAILED DESCRIPTION

Figure 1:
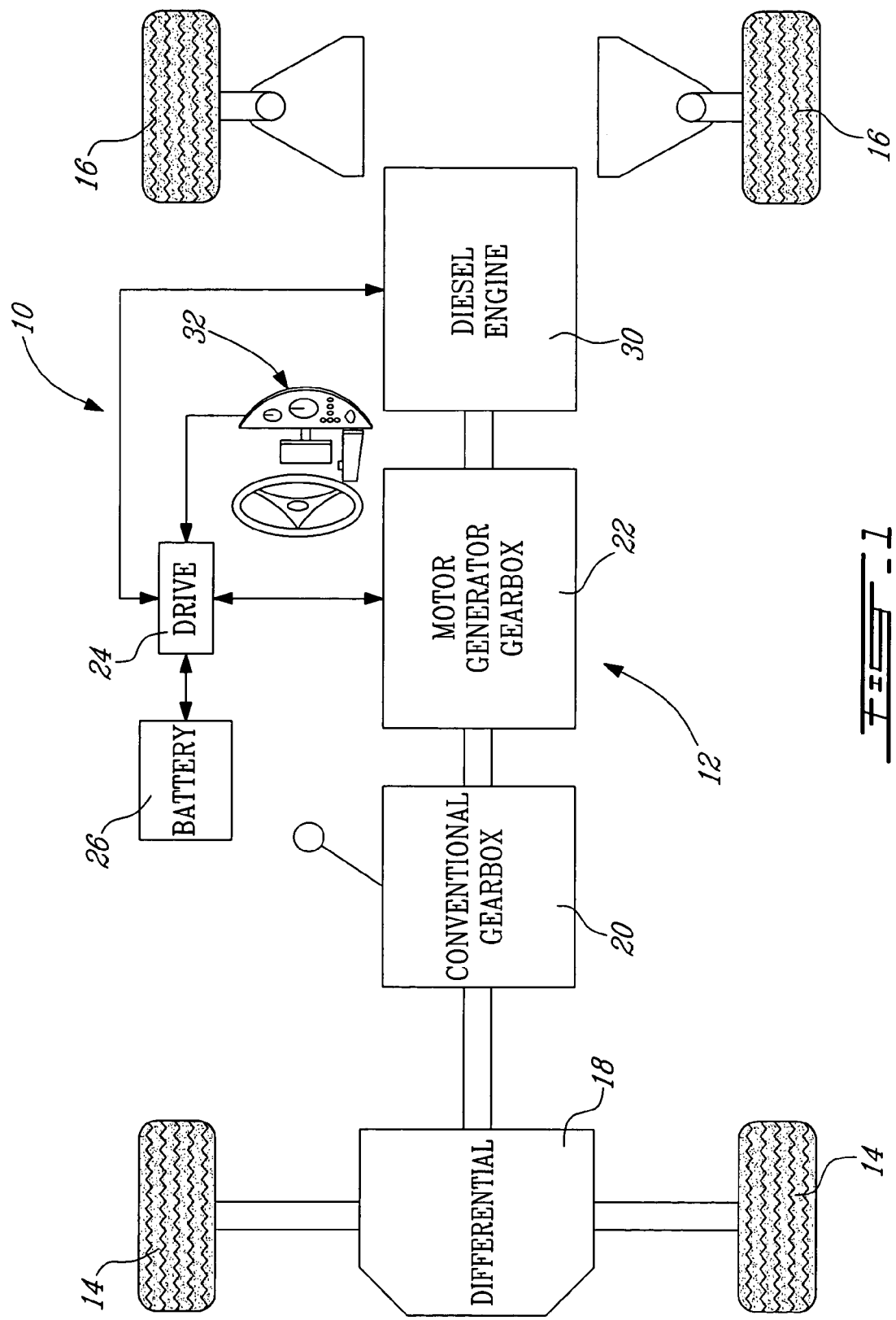
FIG. 1 is a schematic view of a vehicle including a drive train according to an embodiment of the present invention.

In a nutshell, the present invention is concerned with a drive train including an electric motor having a rotor linked to a ground contacting wheel, a combustion engine that may be selectively connected to the ground contacting wheel and an electric generator that may be directly or indirectly connected to the combustion engine.

Turning now to FIG. 1 of the appended drawings, a vehicle 10 provided with a drive train 12 according to an embodiment of the present invention, two driving wheels 14 and two direction wheels 16 will be described.

The drive train 12 includes a conventional differential unit 18, a conventional user-operated gearbox transmission 20, a motor-generator-gearbox unit 22, a drive 24, a battery 26, an internal combustion engine in the form of a diesel engine 30, and user controls 32.

The constitution and operation of the conventional differential unit 18, of the conventional transmission 20, and of the diesel engine 30 will not be described in detail herein since they are believed well known in the art and not particularly relevant to the present invention.

The interconnection between the various elements of the drive train will be described with reference to FIG. 2 that schematically illustrates the motor-generator-gearbox (MGG) unit 22. It is to be noted that FIG. 2 is schematic and that many elements have been omitted from this figure for clarity and concision purposes.

The MGG 22 includes an input shaft 34 connected to the output shaft of the diesel engine 30 and an output shaft 36 connected to the conventional gearbox 20 and hence indirectly to the driving wheels 14. Both input and output shafts 34 and 36 being generally coaxial with a rotation axis 37 of the MGG 22.

An electric motor 38 includes a stator 40 provided with windings 42 and mounted to the housing 44 of the MGG 22; and a rotor 46 provided with permanent magnets 48 and mounted to the output shaft 36.

An electric generator 50 includes a stator 52 provided with windings 54 and mounted to the housing 44 of the MGG 22; and a rotor 56 provided with permanent magnets 58. The rotor 56 of the generator 50 is rotatably mounted to the output shaft 36 via bearings 60 so as to rotate freely about rotation axis 37. The rotor 56 is also provided with a toothed portion 62, the purpose of which will be described hereinbelow.

The MGG 22 also includes a gearbox 64 including a speed increasing gear arrangement 65 and a switching mechanism 66 interconnecting the input shaft 34 to both the output shaft 36 and the generator 50.

The speed increasing gear arrangement 65 includes a freewheeling gear 68 rotatably mounted to the shaft 34 via bearings 70 and a speed increasing gear 67 having a first gear 76 meshed with the toothed portion 62 of the rotor 56 and a second gear 78 meshed with the freewheeling gear 68. Both gears 76 and 78 being interconnected by a shaft 80 rotatably mounted to the housing 44 via bearings 82.

The switching mechanism 66 includes a jaw clutch member 72 so mounted to a splined portion 74 of the shaft 34 as to move longitudinally thereon while being rotated by the input shaft 34.

The freewheeling gear 68 also includes dogs 84 (better seen on FIG. 3). The jaw clutch member 72 includes small dogs 86 configured and sized to mesh with the dogs 84 of the freewheeling gear 68, and large dogs 88 configured and sized to mesh simultaneously with dogs 90 provided on the inner end of the output shaft 36 and with dogs 92 provided on the rotor 56 of the electric generator 50.

The gearbox 64 also includes means (not shown) for moving the jaw clutch member 72 between the positions shown in FIGS. 2 and 3. One skilled in the art will easily understand that these moving means may be electromechanical such as a solenoid (not shown) or purely electrical such as an electromagnet (not shown).

The operation of the MGG 22 will now be described. The MGG 22 may be mounted to many types of vehicles, however, for the following description, the MGG 22 is mounted to a solid waste collection vehicle. Indeed, these vehicles have two main modes of operation. In a first collecting mode, the vehicle goes at low speed, makes frequent stops and accelerates and decelerates quickly. In a second mode, the collected solid waste are taken to a predetermined location and thus the vehicle goes up to highway traveling speeds.

When the vehicle is in the first collecting mode, the jaw clutch member 72 is positioned as illustrated in FIG. 2. More specifically, the small dogs 86 of the member 72 are meshed with the dogs 84 of the freewheeling gear 68.

The MGG 22 is thus configured as a series hybrid drive. Indeed, the output shaft 36 is not linked to the input shaft 24 and thus not linked to the diesel engine 30. Therefore, only the electric motor 38 is used to drive the wheels 14 via the gearbox 20 and the differential 18 (FIG. 1).

The engagement of the jaw clutch member 72 with the freewheeling gear 68 forces the gear 68 to rotate at the same speed as the shaft 34. This rotation of the gear 68 brings the gears 76 and 78 of the speed increasing gear arrangement 66 into rotation and thus forces the rotation of the rotor 56 of the generator 50 via its toothed portion 62.

Power is therefore transferred from the input shaft 34, thus from the engine 30, to the electric generator 50 to generate electricity used to charge the battery 26. Interestingly, since the rotational speed is increased from the shaft 34 to the rotor 56, the engine 30 may run at a low and constant speed while the rotor rotates at an ideal speed for electricity generation. One skilled in the art will be in a position to configure and size the various gear ratios to achieve this goal.

This low and constant speed operation of the engine 30 is interesting since engines usually generate less noise at low speeds. Therefore, less noise is generated while the vehicle collects solid waste in residential neighborhoods, for example.

The electric motor 38 is therefore designed so as to generate enough torque to accelerate the vehicle to the maximal collecting speed (usually about 15 miles per hour). One skilled in the art will be in a position to design the motor 38 accordingly.

It is to be noted that the drive controller 24 controls the MGG 22 and thus the motor 38. Therefore, during the breaking of the vehicle, the motor 38 may be used to help to slow the vehicle by regenerative breaking to thereby partially recharge the battery 26.

When the solid waste collecting is done and the vehicle has to travel to higher speeds to reach a solid waste collection center, the vehicle is placed in a second hybrid parallel mode illustrated in FIG. 3.

This is done by moving the jaw clutch member 72 so that the dogs 88 simultaneously contact the dogs 90 and 92.

It is to be noted that since the drive controller 24 controls the motor 38, the generator 50 and the diesel engine 30 and receives angular position data from these elements, it is possible to plan the best timing for the position change of the jaw clutch member 72.

When the jaw clutch member 72 is in the position illustrated in FIG. 3, the diesel engine 30 directly powers the output shaft 36 and the generator 50 via the input shaft 34.

It is to be noted that since the rotational speed of the engine 30 is higher than it is when running idle, the speed increasing gear arrangement 66 is not used when in this mode.

In this parallel mode, rotors of both the motor 38 and generator 50 are linked. However, they can independently be used as motors to supply power to the wheels or as generators to recharge the battery 26, depending on the control done by the drive controller 24.

Indeed, the drive controller 24 may be programmed with driving modes that take many variables into account, such as the state of charge of the battery and the user's controls, to determine the application of the motor 38 and generator 50.

It is to be noted that while FIGS. 2 and 3 illustrate the electric motor and the electric generator as being electric machines having an internal stator and an external rotor, more conventional electric machines having internal rotors could be used.

It is also to be noted that while, in the above description, a jaw clutch member/dog combination is used to interconnect the input shaft, the output shaft and the rotor of the generator, other mechanical arrangements could be used. For example, a double clutch assembly where the central movable element would be connected to the input shaft and would be configured and sized as to be connectable either to the freewheeling gear 68 or to the output shaft and rotor, could be used.

The appended drawings illustrate the motor 38, the generator 50 and the switching mechanism 64 provided in a single assembly (the MGG 22). However, one skilled in the art could design a drive train where these three elements are physically separated but mechanically interconnected to yield the same functionality.

It is also to be noted that while a diesel engine is illustrated and described herein, other internal combustion engine could be used.

Although the present invention has been described hereinabove by way of preferred embodiments thereof, it can be modified, without departing from the spirit and nature of the subject invention as defined in the appended claims.

What is claimed is:

1. A drive train for a hybrid vehicle including a driving wheel; said drive train comprising:
   an internal combustion engine having a driving shaft;
   an electric motor having a driving shaft connected to the driving wheel of the vehicle;
   an electric generator having a rotor;
   a rotational speed increasing gear arrangement having a high speed portion connected to said rotor of said generator and a low speed portion;
   a switching mechanism including a movable portion so mounted to said driving shaft of said internal combustion engine; as to be movable between a first position where the movable portion interconnects said driving shaft of said engine to said low speed portion of said gear arrangement and a second position where the movable portion interconnects said driving shaft of said engine to both said rotor of said generator and to said driving shaft of said electric motor;
   wherein, a) when said switching mechanism is in said first position, the hybrid vehicle is in a series mode where said generator is operated at nominal rotation speed while said engine operates at low speed and b) when said switching mechanism is in said second position, the hybrid vehicle is in a parallel mode where said generator is operated at a rotation speed of said engine.

2. A drive train as recited in claim 1, wherein said electric motor has an internal stator and an external rotor.

3. A drive train as recited in claim 1, wherein said electric generator has an internal stator and wherein said rotor is external.

4. A drive train as recited in claim 1, wherein:
   said driving shaft of said engine defines a rotation axis;
   said driving shaft of said electric motor is coaxial with said rotation axis; and
   said rotor of said electric generator is coaxial with said rotation axis.

5. A drive train as recited in claim 4, further including a housing in which said electric motor, said electric generator, said rotational speed increasing gear arrangement and said switching mechanism are enclosed.

6. A drive train as recited in claim 5, wherein said rotational speed increasing gear arrangement includes:
   a freewheeling gear so mounted to said driving shaft of said internal combustion engine as to rotate about said rotation axis;
   a speed increasing gear so mounted to said housing as to rotate about an axis generally parallel to said rotation axis, said speed increasing gear having a smaller gear diameter portion meshed with said freewheeling gear and a larger gear diameter portion meshed with said rotor of said electric generator.

7. A drive train as recited in claim 6, wherein said movable portion of said switching mechanism includes a jaw clutch member mounted to a splined portion of said driving shaft of said engine to be rotated thereby while being axially movable between said first and second positions; said jaw clutch member including first dogs that are connected to dogs of said freewheeling gear when said member is in said first position and second dogs that are simultaneously connected to dogs of said driving shaft of said motor and dogs of said rotor of said generator when said member is in said second position.

8. A drive train for a hybrid vehicle including a driving wheel and an internal combustion engine having a driving shaft; said drive train comprising:
   an electric motor having a driving shaft connected to the driving wheel of the vehicle;
   an electric generator having a rotor;
   a rotational speed increasing gear arrangement having a high speed portion connected to said rotor of said generator and a low speed portion;
   a switching mechanism including a movable portion so mounted to said driving shaft of said internal combustion engine as to be movable between a first position where the movable portion interconnects said driving shaft of said engine to said low speed portion of said gear arrangement and a second position where the movable portion interconnects said driving shaft of said engine to both said rotor of said generator and to said driving shaft of said electric motor;
   wherein, a) when said switching mechanism is in said first position, the hybrid vehicle is in a series mode where said generator is operated at nominal rotation speed while the engine operates at low speed and b) when said switching mechanism is in said second position, the hybrid vehicle is in a parallel mode while where said generator is operated at the rotation speed of the engine.

9. A drive train as recited in claim 8, wherein said electric motor has an internal stator and an external rotor.

10. A drive train as recited in claim 8, wherein said electric generator has an internal stator and wherein said rotor is external.

11. A drive train as recited in claim 8, wherein:

the driving shaft of the engine defines a rotation axis;

said driving shaft of said electric motor is coaxial with said rotation axis; and said rotor of said electric generator is coaxial with said rotation axis.

12. A drive train as recited in claim 11, further including a housing in which said electric motor, said electric generator, said rotational speed increasing gear arrangement and said switching mechanism are enclosed.

13. A drive train as recited in claim 12, wherein said rotational speed increasing gear arrangement includes:

a freewheeling gear so mounted to the driving shaft of the internal combustion engine as to rotate about said rotation axis;

a speed increasing gear so mounted to said housing as to rotate about an axis generally parallel to said rotation axis, said speed increasing gear having a smaller gear diameter portion meshed with said freewheeling gear and a larger gear diameter portion meshed with said rotor of said electric generator.

14. A drive train as recited in claim 13, wherein said movable portion of said switching mechanism includes a jaw clutch member mounted to a splined portion of the driving shaft of the engine to be rotated thereby while being axially movable between said first and second positions; said jaw clutch member including first dogs that are connected to dogs of said freewheeling gear when said member is in said first position and second dogs that are simultaneously connected to dogs of said driving shaft of said motor and dogs of said rotor of said generator when said member is in said second position.

* * * * *